Patented Dec. 25, 1945

2,391,667

UNITED STATES PATENT OFFICE 2,391,667

PYROLYSIS OF ALKANOLS

James L. Amos, Midland, and Frederick J. Soderquist, Bay City, Mich., assignors to The Dow Chemical Company, Midland, Mich., a corporation of Michigan No Drawing. Application February 28, 1942, Serial No. 432,826

16 Claims. (Cl. 260—681)

This invention relates to the pyrolysis of alkanols and more particularly to the formation thereby of conjugated diolefins.

It is known that certain alkanols may be pyrolyzed to form conjugated diolefins, but the yields obtained, particularly when the pyrolysis is carried out without the use of a catalyst, are unsatisfactory and the process uneconomical. Although the use of solid catalysts such as metal compounds, porous substances, etc., favors a somewhat higher yield of the diolefin, the processes heretofore described in which such catalysts are used have a number of disadvantages. The conversion of the alkanol to conjugated diolefin is low, thus necessitating the separation and recovery of large quantities of the alkanol from the diolefin in the reacted mixture. Furthermore, the use of the usual solid catalytic bodies alone leads to considerable decomposition in the reaction mixture to form free carbon which collects on the catalytic body and soon renders it inactive so that frequent interruptions of the operation are necessary to regenerate or replace the catalyst.

We have found that alkanols containing four to five carbon atoms in the molecule in which the hydroxyl group is attached to a carbon atom in a straight chain of at least four carbon atoms may be pyrolyzed readily, and with a high conversion during a single pass through the reaction zone, to form conjugated diolefins by heating in the presence of water vapor and a hydrogen halide catalyst. We have further found that when the pyrolysis is carried out in this manner, the use of the usual solid catalytic bodies, such as metal compounds, porous substances, etc., may, if desired, be omitted. Consequently, the necessity of frequently stopping the operation to clean or regenerate such solid catalyst is avoided. By using a hydrogen halide catalyst to promote the reaction, carbonization may be greatly reduced and a crude diolefin fraction may be recovered from the reacted mixture containing an exceptionally high proportion of diolefin, thus greatly facilitating isolation of purified diolefin from the fraction.

The pyrolysis is carried out in any suitable manner, e. g., by passing the alkanol, water, and hydrogen halide catalyst in vapor phase through heated tubes. Although the process may be carried out in the absence of the usual solid catalytic bodies, it should be mentioned that such bodies may also be employed if desired. In some instances the use of such catalytic bodies will even lead to appreciably better yields of diolefin and at lower temperatures than when the solid catalytic body is omitted. Furthermore, the use of water vapor and a hydrogen halide catalyst in the reaction mixture decreases the formation of free carbon on the catalytic body and increases the length of time over which the latter may be used without regeneration. However, the advantages gained by the use of such catalytic bodies do not always justify the added expense and inconvenience involved, and the invention may be practiced either with or without the use of auxiliary solid catalytic bodies.

The alkanol, which may comprise 1-butanol, 2-butanol, 2-methyl-1-butanol, 3-methyl-1-butanol, 2-methyl-2-butanol, 3-methyl-2-butanol, 1-pentanol, 2-pentanol, or 3-pentanol, may arise in any of a number of ways, such as by the hydration of an alkene or by the hydrolysis of a haloparaffin. Although the purity of the reaction product depends somewhat on the purity of the alkanol used, the invention contemplates the use of alkanols, or mixtures thereof with at least minor proportions of alkanes, alkenes and substances which may be found associated with the alkanol, particularly with alkenes such as may be recovered from among the reaction products resulting from the pyrolysis of alkanols according to the present invention. Reference is made to our copending application Serial No. 432,825, which issued as Patent No. 2,370 513 on February 27, 1945, in which the pyrolysis of alkenes in the presence of water vapor and a hydrogen halide catalyst is described.

The hydrogen halide catalyst may be obtained from any convenient source, such as by the action of sulphuric acid on sodium chloride or as by-product hydrogen halide recovered from a halogenation reaction wherein a hydrogen halide is one of the products. Mono- or poly-halohydrocarbons, halohydrins, halocarboxylic acids, haloesters, etc., which are capable of being decomposed during the pyrolysis to form a hydrogen halide may also be used as a means of introducing the hydrogen halide into the reaction mixture and are herein included in the term "hydrogen halide catalyst." In similar manner the term, "hydrogen bromide catalyst," as used herein, includes hydrogen bromide and compounds which decompose during the pyrolysis to form hydrogen bromide. Among the halogen compounds which may be incorporated in the reaction mixture and which decompose during the pyrolysis to furnish a hydrogen halide are ethylene chloride, ethyl bromide, propylene bromide, propyl chloride, butyl bromide, butyl iodide, butyl chloride, butylene bromide, butylene chloride, amyl bromide, allyl bromide, ethylene bromohydrin, ethylene chlorohydrin, propylene chlorohydrin, chloroacetic acid, bromoacetic acid, ethyl chloroacetate, ethyl bromoacetate, chloroethyl acetate, etc. The use of haloparaffins having the same number of carbon atoms in the molecule as the diolefin being produced is particularly advantageous, since during the decomposition of the haloparaffin to produce a hydrogen halide, the desired conjugated diolefin is usually also formed. Mixtures of hydrogen halide catalysts may be used, if desired. When hydrogen chloride is used, its constant boiling mixture with water may be employed advantageously, since the use of such mixture simplifies the introduction of the acid and water in constant proportion into the reaction mixture. Furthermore, the constant boiling mixture may be condensed readily from the reaction mixture, if desired, and be re-used in the process. Alternatively, the water may be introduced as steam into the reaction mixture.

The proportions of the reactants will, of course, vary somewhat with the particular alkanol and hydrogen halide catalyst used and, also, with the pyrolysis conditions which are employed. Thus, under otherwise comparable conditions, hydriodic acid is more effective than hydrobromic acid, which, in turn, is more effective than hydrochloric acid. Less than one chemical equivalent, usually from 0.01 to 0.8 chemical equivalent of hydrogen halide catalyst is used for each mol of alkanol. It should be mentioned that a chemically equivalent proportion of hydrogen halide catalyst is considered herein as being equal to the molecular proportion of the same divided by the number of halogen atoms in the molecule. From 1 to 60 mols, preferably from 3 to 45 mols of water is used for each mol of alkanol, although larger proportions of water may be used if desired. It is, of course, obvious that the use of excessive proportions of water may render the process less economical due to the larger amount of heat required to bring the mixture to the pyrolyzing temperature.

The reactants are usually preheated separately before being mixed together and subjected to the pyrolysis, although they may be heated after being mixed, if desired. The steam may be advantageously superheated and mixed with the other ingredients to supply the heat of pyrolysis to the mixture. It should be mentioned that corrosion of the equipment used for handling the reactants may be greatly reduced by introducing the hydrogen halide catalyst in the form of a compound which decomposes in the reaction zone to liberate a hydrogen halide or, in case a hydrogen halide is used, by admixing it, preferably without preheating, with the other ingredients just prior to the entrance of the reaction mixture into the reaction zone.

Although the temperature depends somewhat upon the hydrogen halide catalyst used and the proportion thereof in the reaction mixture the pyrolysis is usually carried out at temperatures between 600° and 950° C., preferably between 650° and 900° C. The time of pyrolysis is usually measured by the space velocity of the alkanol within the reaction zone. The space velocity of the alkanol may be defined as the number of cubic feet of gaseous alkanol, referred to standard conditions of 0° C., and 760 mm. of mercury pressure, passing through the reaction zone per hour per cubic foot of reaction zone. It should be noted that the space velocity as defined above refers to the alkanol in the reaction mixture and not to the reaction mixture as a whole. Thus, the space velocity of the alkanol may be spoken of independently of the composition of the reaction mixture. The space velocity of the alkanol is usually maintained between 50 and 500, and preferably between 100 and 400. Higher or lower space velocities may, of course, be maintained if desired. The pyrolysis is usually carried out at atmospheric pressure, but higher or lower pressures may be used.

After the pyrolysis, the reaction mixture which comprises water vapor, a hydrogen halide, the conjugated diolefin, i. e., 1.3-butadiene or a methylbutadiene, and any unconverted alkanol together, usually, with a considerable proportion of alkene may be treated in any of a number of ways to recover the conjugated diolefin formed during the pyrolysis. For example, the gaseous mixture may be cooled to condense out an aqueous solution of the hydrogen halide together with the alkanol, which may be either separated and recovered, if desired, or returned without separation to the pyrolysis step. The uncondensed portion may be scrubbed with water to remove any remaining traces of hydrogen halide and the washed gases then fractionally condensed to recover a crude alkene-diolefin fraction containing the diolefin in high concentration. The mixture of alkene and diolefin may then be separated into its components in known manner, e. g., by extraction with a selective solvent for the diolefin or by reaction of the diolefin with a reagent such as cuprous chloride to form an insoluble complex salt, to recover substantially pure conjugated diolefin and an alkene fraction which may, if desired, be returned to the pyrolyzing step. In some instances the mixture of alkene and diolefin may be used directly as a source of diolefin, e. g., in the preparation of sulphones of diolefins by selective reaction of the diolefin in the hydrocarbon mixture with sulphur dioxide.

The accompanying table shows the results of a number of experiments carried out at atmospheric pressure in each of which one mol of the alkanol listed was passed, together with the noted amounts of steam and of the indicated hydrogen halide catalyst, through a heated reaction chamber packed in most instances with a solid catalyst as noted. The pyrolysis conditions, i. e., the space velocity of the alkanol and the temperature, are noted for each experiment together with the mols of alkanol recovered, the mols of conjugated diolefin formed, and the mols of diolefin formed per mol of alkanol consumed. In the last column is listed the per cent diolefin in the diolefin fraction recovered from the reacted mixture prior to separation of the fraction into its components.

temperature in the range 600 to 950° C., and recovering a conjugated diolefin from the reacted mixture.

*Table*

| Exp. No. | Alkanol | Mol alkanol used | Hydrogen halide catalyst | Mol hydrogen halide catalyst | Solid catalyst | Mol steam | Pyrolysis conditions | | Mol alkanol recovered | Mol Mono-olefin recovered | Mol conjugated diolefin formed | Mol diolefin formed per mol alkanol consumed | Per cent diolefin in diolefin fraction |
|---|---|---|---|---|---|---|---|---|---|---|---|---|---|
| | | | | | | | Space velocity | Temp. (0° C.) | | | | | |
| 1 | n-Butanol | 1 | | | Pumice | 47.5 | 105 | 800 | 0.76 | 0.10 | 0.016 | 0.07 | 12.7 |
| 2 | ---do--- | 1 | HBr | 6.53 | ---do--- | 22.5 | 108 | 800 | None | 0.04 | 0.124 | 0.124 | 74.5 |
| 3 | 2-Pentanol | 1 | | | Activated alumina (4-8 mesh) | 10 | 290 | 725 | None | 0.30 | 0.20 | 0.20 | 30. |
| 4 | ---do--- | 1 | HBr | 0.44 | ---do--- | 17.8 | 168 | 725 | None | 0.21 | 0.44 | 0.44 | 58.6 |

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, water vapor and a hydrogen halide catalyst through a reaction zone maintained at a pyrolyzing temperature.

2. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, water vapor and a hydrogen halide catalyst through a reaction zone maintained at a temperature in the range 600° to 950° C.

3. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, water vapor and a hydrogen halide catalyst through a reaction zone at a space velocity which, when expressed as at standard conditions, corresponds to between 50 and 500 cubic feet of the vaporized alkanol per cubic foot of the reaction zone per hour, while maintaining said zone at a temperature in the range 600 to 950° C., and recovering a conjugated diolefin from the reacted mixture.

4. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, water vapor and less than one chemically equivalent proportion of a hydrogen halide catalyst through a reaction zone at a space velocity which, when expressed as at standard conditions, corresponds to between 50 and 500 cubic feet of the vaporized alkanol per cubic foot of the reaction zone per hour, while maintaining said zone at a temperature in the range 600 to 950° C., and recovering a conjugated diolefin from the reacted mixture.

5. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, from 1 to 60 molecular proportions of water vapor and less than one chemically equivalent proportion of a hydrogen halide catalyst through a reaction zone at a space velocity which, when expressed as at standard conditions, corresponds to between 50 and 500 cubic feet of the vaporized alkanol per cubic foot of the reaction zone per hour, while maintaining said zone at a temperature in the range 600 to 950° C., and recovering a conjugated diolefin from the reacted mixture.

6. The method for preparing a conjugated diolefin which consists in passing a gaseous mixture comprising an alkanol containing from four to five carbon atoms in the molecule and having a hydroxyl group attached to a carbon atom in a straight chain of at least four carbon atoms, from 1 to 60 molecular proportions of water vapor and from 0.01 to 0.8 chemically equivalent proportion of a hydrogen halide catalyst through a reaction zone at a space velocity which, when expressed as at standard conditions, corresponds to between 50 and 500 cubic feet of the vaporized alkanol per cubic foot of the reaction zone per hour, while maintaining said zone at a temperature in the range 600 to 950° C., and recovering a conjugated diolefin from the reacted mixture.

7. The method for preparing 1.3-butadiene which consists in passing a gaseous mixture comprising a butanol having a straight carbon chain, water vapor and a hydrogen halide catalyst through a reaction zone maintained at a pyrolyzing temperature and recovering 1.3-butadiene from the reacted mixture.

8. The method for preparing 1.3-butadiene which consists in passing a gaseous mixture comprising a butanol having a straight carbon chain, water vapor and less than one chemically equivalent proportion of a hydrogen halide catalyst through a reaction zone at a space velocity which, when expressed as at standard conditions, corresponds to between 50 and 500 cubic feet of the vaporized butanol per cubic foot of the reaction zone per hour, while maintaining said zone at a temperature in the range 600 to 950° C., and recovering 1.3-butadiene from the reacted mixture.

9. The method for preparing 1.3-butadiene which consists in passing a gaseous mixture comprising a butanol having a straight carbon chain, from 1 to 60 molecular proportions of water vapor and from .01 to .8 equivalent proportions of a hydrogen halide catalyst through a reaction zone at a space velocity which, when expressed as at standard conditions, corresponds to between 50 and 500 cubic feet of the vaporized butanol per cubic foot of the reaction zone per hour, while maintaining said zone at a temperature in the range 600 to 950° C., and separating 1.3-butadiene from the reacted mixture.

10. The method for preparing 1.3-butadiene which consists in passing a gaseous mixture comprising n-butanol, from 1 to 60 molecular proportions of water vapor and from .01 to .8 equivalent proportions of a hydrogen halide catalyst through a reaction zone at a space velocity which, when expressed as at standard conditions, corresponds to between 50 and 500 cubic feet of the vaporized butanol per cubic foot of the reaction zone per hour, while maintaining said zone at a temperature in the range 600 to 950° C., and separating 1.3-butadiene from the reacted mixture.

11. The method for preparing a conjugated diolefin which consists in passing a gaseous mixture comprising a pentanol having an unsaturated straight chain of at least 4 carbon atoms, water vapor, and a hydrogen halide catalyst through a reaction zone maintained at a pyrolyzing temperature and recovering a conjugated diolefin from the reacted mixture.

12. The method for preparing a conjugated pentadiene which consists in passing a gaseous mixture comprising a pentanol having an unsaturated straight chain of at least 4 carbon atoms, water vapor, and less than one chemically equivalent proportion of a hydrogen halide catalyst through a reaction zone at a space velocity which, when expressed as at standard conditions, corresponds to between 50 and 500 cubic feet of the vaporized pentanol per cubic foot of the reaction zone per hour, while maintaining said zone at a temperature in the range 600 to 950° C., and recovering a conjugated pentadiene from the reacted mixture.

13. The method for preparing a conjugated pentadiene which consists in passing a gaseous mixture comprising a pentanol having an unsaturated straight chain of at least 4 carbon atoms, from 1 to 60 molecular proportions of water vapor and from .01 to .8 equivalent proportions of a hydrogen halide catalyst through a reaction zone at a space velocity which, when expressed as at standard conditions, corresponds to between 50 and 500 cubic feet of the vaporized pentanol per cubic foot of the reaction zone per hour, while maintaining said zone at a temperature in the range 600 to 950° C., and separating a conjugated pentadiene from the reacted mixture.

14. The method for preparing methyl butadiene which consists in passing a gaseous mixture comprising 2-pentanol, water vapor, and a hydrogen halide catalyst through a reaction zone maintained at a pyrolyzing temperature and recovering methyl butadiene from the reacted mixture.

15. The method for preparing methyl butadiene which consists in passing a gaseous mixture comprising 2-pentanol, water vapor, and less than one chemically equivalent proportion of a hydrogen halide catalyst through a reaction zone at a space velocity which, when expressed as at standard conditions, corresponds to between 50 and 500 cubic feet of the vaporized pentanol per cubic foot of the reaction zone per hour, while maintaining said zone at a temperature in the range 600 to 950° C., and recovering methyl butadiene from the reacted mixture.

16. The method for preparing methyl butadiene which consists in passing a gaseous mixture comprising 2-pentanol, from 1 to 60 molecular proportions of water vapor and from .01 to .8 equivalent proportions of a hydrogen halide catalyst through a reaction zone at a space velocity which, when expressed as at standard conditions, corresponds to between 50 and 500 cubic feet of the vaporized pentanol per cubic foot of the reaction zone per hour, while maintaining said zone at a temperature in the range 600 to 950° C., and separating methyl butadiene from the reacted mixture.

JAMES L. AMOS.
FREDERICK J. SODERQUIST.